Oct. 13, 1953    F. W. CHAPMAN    2,655,036
FREQUENCY MODULATED TORSIONAL VIBRATION ANALYZER
Filed Oct. 1, 1947    2 Sheets-Sheet 1

Inventor
Frederick W. Chapman
By
Spencer Willits, Helmig Gaillio
Attorneys

Oct. 13, 1953  F. W. CHAPMAN  2,655,036
FREQUENCY MODULATED TORSIONAL VIBRATION ANALYZER
Filed Oct. 1, 1947  2 Sheets-Sheet 2

Inventor
Frederick W. Chapman
By
Spencer, Willits, Helwig & Baillio
Attorneys

Patented Oct. 13, 1953

2,655,036

UNITED STATES PATENT OFFICE 2,655,036

FREQUENCY MODULATED TORSIONAL VIBRATION ANALYZER

Frederick W. Chapman, Highland Park, Mich., assignor to General Motors Corporation, Detroit, Mich., a corporation of Delaware Application October 1, 1947, Serial No. 777,197

3 Claims. (Cl. 73—68)

The present invention relates to torsional vibration analyzers. More particularly it relates to torsional vibration analyzers of the type adapted to analyze torsional vibration in reciprocating engine crankshafts. It further relates to torsional vibration analyzers having magnetic pickups capable of generating a signal with frequency proportional to the angular velocity of the shaft, and which include a discriminator circuit whose output is a signal having an amplitude proportional to the amplitude of the angular deviation of the crankshaft oscillations, and whose frequency is equal to the frequency of the torsional vibration oscillations.

Recent developments in high speed internal combustion engines, especially those for use in automotive vehicles, have led to a need for more precise analyzation of the torsional oscillations of crankshafts over a wide range of operating speeds. It is quite desirable that such an instrument be capable of measuring the amplitude of the oscillations and also of determining the various frequency components included in these oscillations.

Previous to the present invention, various types of mechanical, electrical, and optical torsional vibration measuring devices have been used. Many of these devices use electromagnetic or electrodynamic transducers. Some of these devices used wire strain gages and others used photoelectric devices having a variable aperture. All of these previously used measuring devices include what may be called a seismic element. They have an element which rotates at a uniform speed regardless of the torsional vibration and an element which is responsive to the torsional vibration. By combining the output of these two elements the amplitude and frequency of the torsional vibration may be determined.

It is therefore an object of the present invention to produce an accurate torsional vibration oscillation analyzer.

It is a further object of the present invention to produce a torsional vibration oscillation analyzer having no device rotating at uniform mean crankshaft speed.

It is a still further object of the present invention to produce a device capable of analyzing automotive crankshaft torsional vibrations over a large range of operating speeds so as to determine the amplitude, frequency, and mode of oscillation.

One modification of the present invention includes a gear tooth type generator which is mounted on the engine shaft under examination. The output of this device is a signal whose frequency is proportional to the speed of the engine shaft at the point of mounting. This output in the form of an electrical signal is amplified by means of a limiting amplifier to remove any amplitude modulation. It is fed into a discriminator circuit the output of which is a signal proportional in amplitude to the amplitude of oscillation and equal in frequency to the frequency of oscillation, of the crankshaft. This output signal is filtered and observed on a cathode ray oscillograph, cathode ray oscilloscope or a standard wave analyzer.

Referring to the figures.

Figure 1:
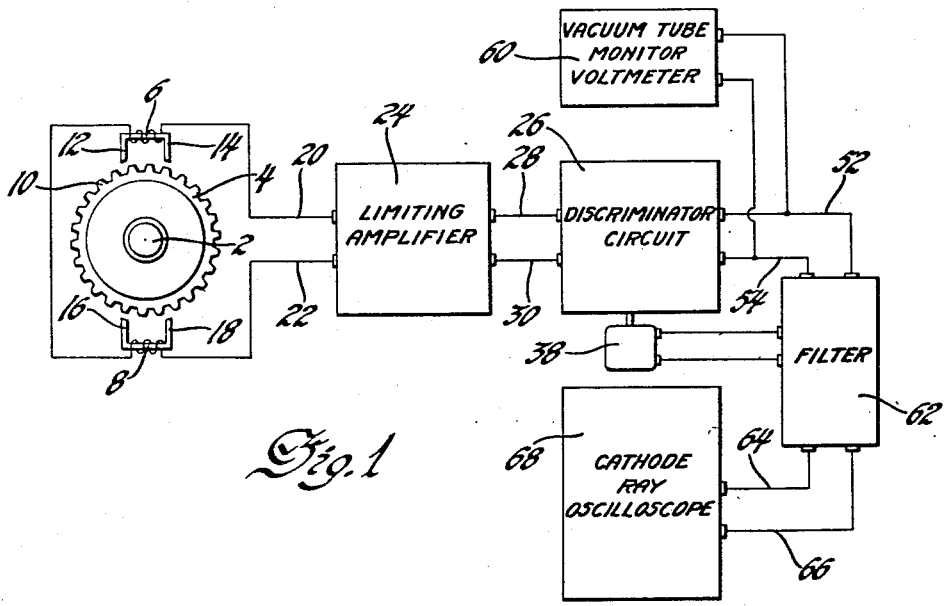
Figure 1 is a block diagram of the present invention.

Referring more particularly to Figure 1, 2 is an engine crankshaft, the torsional vibration characteristics of which it is desired to determine. 4 is a steel gear rigidly secured to the crankshaft so as to rotate concentrically with the crankshaft. 6 and 8 are electromagnetic pickups connected on opposite sides of the gear 4 so that their output signals are in aiding phase. The signal generated by the passage of the teeth 10 of the gear 4 past the projections 12 and 14 of the magnet 6 and the projections 16 and 18 of the magnet 8 is fed through conductors 20 and 22 to a limiting amplifier 24. It has been found quite desirable to use a limiting amplifier following the signal generator for two reasons, first because the amplitude output of a tooth wheel generator is proportional to the speed of the teeth, and second because it is quite difficult to avoid a small amount of eccentricity between the tooth wheel and pickup coils. The first factor mentioned above would necessitate the manual adjustment of the generator output each time a different operating speed is used. The eccentricity produces a low frequency amplitude modulation superimposed on the frequency modulation produced by the torsional oscillation of the crankshaft. The solution of these problems is the use of a limiting amplifier of conventional design such as shown as 24. This limiting amplifier, however, may be eliminated without departing from the broader aspects of the present invention.

A discriminator circuit 26 is coupled to the output of the limiting amplifier 24. This discriminator is an audio frequency version of the type generally employed in radio frequency automatic frequency control circuits and in frequency modulation radio receiver detector circuits.

Figure 2:
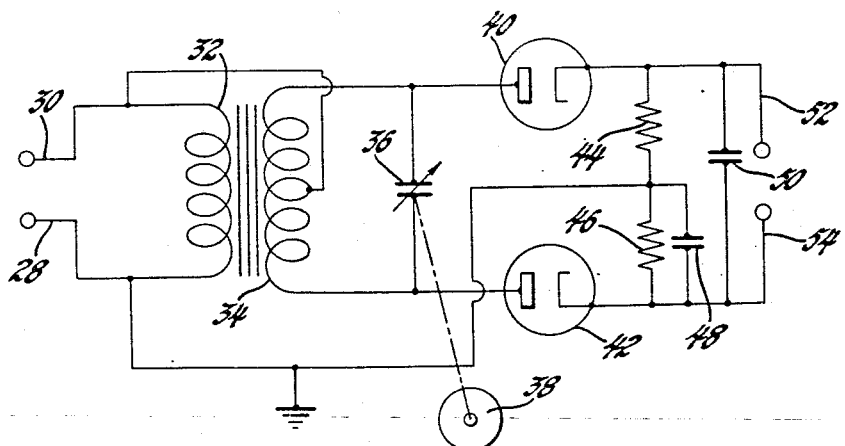
Figure 2 is a discriminator circuit used in one modification of the present invention.
Figure 4:
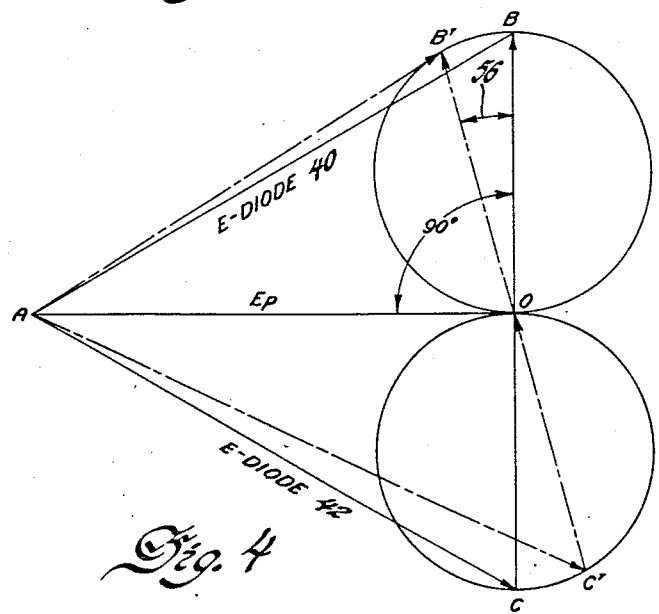
Figure 4 is a vector diagram of the electrical signals in a discriminator circuit.

Referring to Figure 2 this discriminator circuit is shown in greater detail. This discriminator circuit includes input conductors 28 and 30, a transformer having a primary 32 and a center tapped secondary 34, a tuning condenser 36 which is mechanically connected to the control motor 38 for automatic tuning operation, diodes 40 and 42 of similar characteristics, and resistors 44 and 46 of equal value. It also includes bypass condensers 48 and 50, and output conductors 52 and 54. The discriminator operation of this circuit depends on the phase relationship between the primary 32 and the secondary 34. In a tuned circuit the phase difference between a primary and secondary is 90° at resonance. This relationship changes very rapidly if the frequency is varied from resonance. The condenser 36 is adjusted so as to produce a tuned circuit with secondary 34 which is resonant at the mean output frequency of the gear tooth generator. This resonant circuit is loaded by a differentially connected diode circuit including diodes 40 and 42 and their load resistances 44 and 46. The condensers 48 and 50 maintain these diode cathodes at ground potential with respect to the resonant circuit frequency. Under conditions where the signal across the primary 32 is the same as the resonant frequency of the circuit 34—36 each diode load circuit has a voltage applied across it which is the vector sum of the primary voltage and one-half of the secondary voltage. This relationship is shown in Figure 4 by solid lines. Thus at resonance the voltages across the resistors 44 and 46 are equal and of opposite polarity. This produces a zero voltage across the conductors 52, 54.

Figure 3:
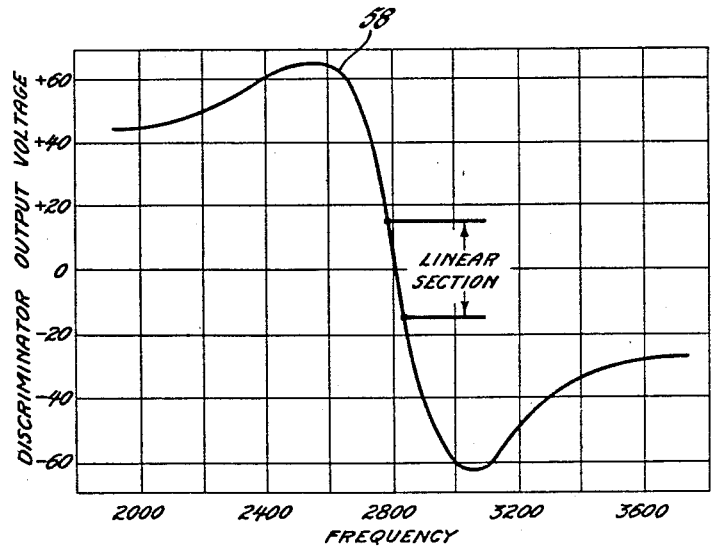
Figure 3 is a graph showing the output of the discriminator.

Under conditions of torsional oscillation the gear 4 will alternately rotate at an angular velocity greater than and less than the mean velocity of the crankshaft. This will produce a frequency modulated output signal the frequency of which varies above and below the resonant frequency of the circuit 34, 36 in accordance with the amplitude and period of the torsional vibration oscillations. Under conditions of non-resonance the phase relationship between the primary 32 and secondary 34 varies from 90°. This angle of variation is shown in Figure 4 as 56. Under these conditions of non-resonance the primary voltage remains of constant amplitude due to the action of the limiting amplifier 24 but the voltage across the two halves of the secondary 34 vary in phase and amplitude. Their angular relationship is shown in Figure 4 by the dotted lines O, B' and C', O. The signal impressed across the diode circuit then becomes A, B' across diode 40, and A, C' across diode 42. The amplitude of these two signals are not equal and therefore their rectified differential does not equal zero. This produces a signal between the conductor 52 and 54 whose amplitude is dependent upon the difference in frequency between the signal across the primary and the resonant frequency of the secondary circuit. A plot of the output across the conductors 52 and 54 against the frequency produced by the gear tooth generator is shown in Figure 3. The center portion of this graph 58 is a straight line and may be used to indicate frequency deviation. The output across the discriminator circuit is coupled to the vacuum tube monitor voltmeter 60 and to a filter network 62. This filter network is of conventional design and has a low pass output passing all frequencies within the range of the torsional oscillation frequencies to be measured. A second output of this filter is a D. C. control voltage for energizing the tuning motor 38. Filter networks suitable for use herein are illustrated at page 228 of the "Radio Engineers' Handbook" by F. E. Terman, first edition, 1943, McGraw-Hill Book Co., Inc. It may thus be seen that as the mean frequency of the generator deviates from the resonant frequency of the circuit 34, 36, due, for example to a change in the rotational speed of the shaft 2, and is predominantly above or below this resonant frequency either a plus or minus control voltage will energize the motor 38 for correct direction of rotation of the motor to drive the tuning means to retune the resonant circuit to a new resonant frequency which is the mean frequency of the deviations. The direct current control motor 38 is responsive to the direct current output of the discriminator circuit and adjusts the variable condenser 36 therein so as to tune the discriminator to a new resonant frequency corresponding to a change in the mean frequency of the generated signal such as may occur when the engine increases or decreases its R. P. M. The D. C. control motor will not be responsive to the alternating current components in the output of the discriminator or filter network since the positive and negative alternations of these alternating currents produce relatively rapid equal and opposite effects on the motor torque and will not be followed by the motor due to its mechanical inertia. The alternating current output across the conductors 64 and 66 is proportional in amplitude to the angular velocity deviation of the gear 4 from the mean angular velocity of the crankshaft. The A. C. signal across the conductors 64, 66 theerfore contains all the frequency components present in the torsional oscillation of the crankshaft. This output is connected to the vertical deflection plates of a cathode ray oscilloscope or oscillograph 68. These amplitudes may be measured on a cathode ray tube by noting the vertical amplitude wave tracing. The frequency components may be determined by noting the Lissajous figures on the cathode ray tube trace. The cathode ray oscilloscope 68 is of a common commercially available type having a condenser input and, therefore, will not be affected by any D. C. component that may appear in the output of the filter, whereby only the torsional frequency components will be displayed thereon.

The cathode ray oscilloscope 68 may be replaced by an electric wave analyzer of conventional design and the amplitude and frequency of the various components of the elctrical-wave across the conductors 64 and 66 determined.

*Operation*

The gear 4 is attached to that part of the crankshaft 2, the torsional vibration characteristics of which it is desired to determine. In automotive engines, this is usually the front end of the crankshaft. The electromagnetic pickups 6 and 8 are rigidly mounted on the frame of the engine. The condenser 36 is adjusted to the approximate operating speed of the engine. The gear tooth generator produces a frequency modulated wave whose frequency deviation is proportional to the angular velocity deviation of the gear 4 from the mean angular velocity of the crankshaft. This frequency modulated signal is amplified by amplifier 24 and detected by discriminator 26. The filter 62 produces a D. C. control voltage for varying the condenser 36 to maintain the circuit 34, 36 resonant at the mean frequency of the gear tooth generator. The torsional oscillation frequency components are filtered by the filter and fed to the cathode ray oscilloscope 68. They may here be observed and their frequency and magnitude determined.

It is to be understood also that although the invention has been described with specific reference to a particular embodiment thereof, it is not to be so limited, since changes and alterations therein may be made which are within the full intended scope of this invention as defined by the appended claims.

I claim:

1. An apparatus for analyzing torsional vibrations of a rotating body comprising, in combination, an A. C. generator adapted to be coupled to the body for rotation thereby to generate an A. C. potential the frequency of which is directly proportional to the angular velocity of said rotating body, a limiting amplifier coupled to the output of the generator, a frequency discriminator circuit for converting frequency variations into amplitude variations coupled to the output of said amplifier, said discriminator circuit being adapted to develop a potential the instantaneous amplitude of which is indicative of the instantaneous deviation of the generated A. C. frequency from the tuned frequency of said discriminator circuit, means for tuning said discriminator circuit to the mean frequency of said A. C. generator, low pass filter means coupled to the output of said discriminator circuit to suppress potentials of generator frequency appearing in the output of said discriminator circuit, means coupled to the output of said filter means for exhibiting the said instantaneous potential developed by said discriminator circuit as an indication of torsional vibration of the body and means responsive to the output of said discriminator circuit for tuning said discriminator circuit to the mean frequency of the A. C. generator output.

2. Apparatus for analyzing torsional vibrations of a rotating body comprising, in combination, generating means coupled to said rotating body for generating a signal the frequency of which is proportional to the rotational speed of said body and which varies in accordance with torsional oscillations thereof, frequency discriminating means including resonant circuit means therein tunable to the mean frequency of said generated signal and connected to receive said signal for translating the frequency variations thereof into amplitude variations of a signal having a high frequency component corresponding to the mean frequency of said generated signal, a lower frequency component corresponding to the torsional oscillations of said body as determined by the frequency deviation of said generated signal from the resonant frequency of said tunable circuit and a direct current component corresponding to the frequency drift of the mean frequency of said generated signal accompanying a change in the average rotational speed of said body, low pass filter means connected to said frequency discriminating means for suppressing said high frequency component of said generated signal, control means responsive to the said direct current component of said translated signal and connected to adjust the tuning of said tunable circuit of said discriminator means to the mean frequency of said generated signal corresponding to the changed rotational speed of said body and indicating means coupled to said filter means and responsive to the torsional vibration component of said generated signal.

3. A torsional vibration frequency analyzer for rotating shafts including, in combination, a toothed gear rigidly attached to a rotating shaft, a stationary member supporting said shaft, two U-shaped magnets rigidly attached to said stationary member and diametrically arranged with said shaft in inductive relationship with the teeth on said gear, induction coils wound on said magnets and connected in series aiding relationship to produce an electrical signal which is the sum of the signals produced in each of the coils by the magnetic induction between the said gear teeth and said magnets, a limiting amplifier connected to said coils to receive and amplify said electrical signal to a predetermined magnitude, a discriminator network connected to receive the amplified said electrical signal from said limiting amplifier, said discriminator network having a tunable resonant circuit therein and producing a signal including higher frequency currents corresponding to the mean frequency of the said electrical signal produced in said coils, lower frequency currents corresponding to and lying in the frequency range of the torsional oscillations of said shaft and a direct current whose amplitude varies with the frequency deviation of the said electrical signal produced in said coils from the discriminator mean frequency as determined by the resonant frequency of the said tunable resonant circuit therein, a filter system connected to said discriminator network to separate the said direct current and the said torsional vibration lower frequency currents from the said higher frequency currents, an electric motor energized by the direct current from said filter for adjusting said tunable resonant circuit in said discriminator network and means responsive to the said lower frequency currents from said filter for determining the amplitudes and frequencies of the lower frequency currents in the torsional vibration range.

FREDERICK W. CHAPMAN.

References Cited in the file of this patent

UNITED STATES PATENTS

| Number | Name | Date |
|---|---|---|
| 2,208,091 | Zakarias | July 16, 1940 |
| 2,233,751 | Seeley | Mar. 4, 1941 |
| 2,340,609 | Mestas | Feb. 1, 1944 |
| 2,361,990 | Brown | Nov. 7, 1944 |
| 2,399,635 | Hope | May 7, 1946 |

FOREIGN PATENTS

| Number | Country | Date |
|---|---|---|
| 892,358 | France | Jan. 7, 1944 |